Figure 1:
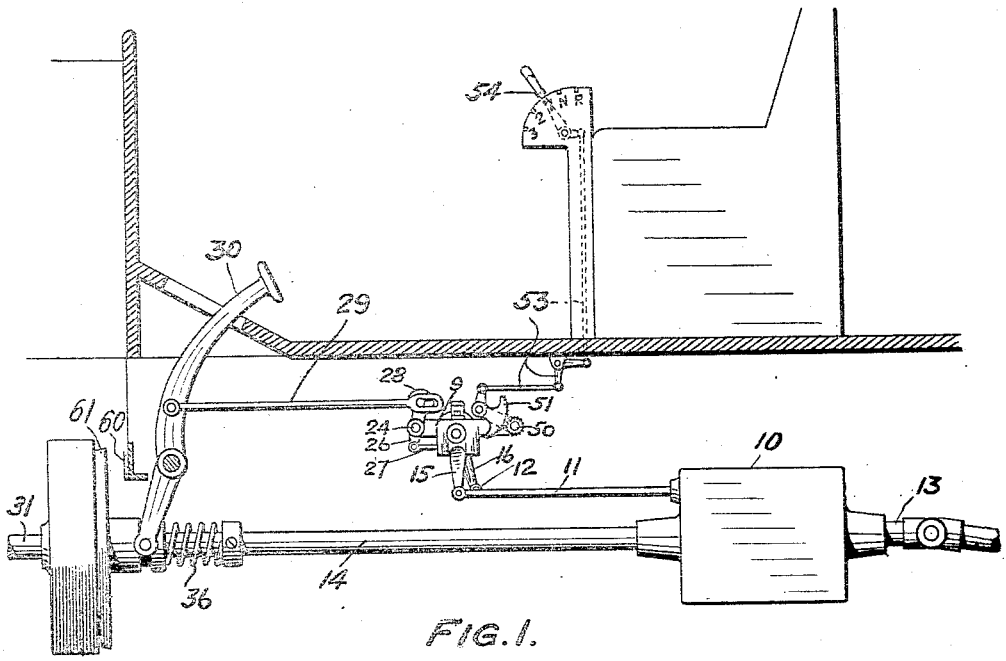

D. C. LEWIS.
MECHANICALLY OPERATED GEAR CHANGING MECHANISM FOR AUTOMOBILES.
APPLICATION FILED APR. 9, 1915.

1,169,081.

Patented Jan. 18, 1916.
4 SHEETS—SHEET 1.

WITNESS:

INVENTOR
Dean C. Lewis
BY
Frank L. Busser
ATTORNEY.

D. C. LEWIS.
MECHANICALLY OPERATED GEAR CHANGING MECHANISM FOR AUTOMOBILES.
APPLICATION FILED APR. 9, 1915.

1,169,081.

Patented Jan. 18, 1916.

4 SHEETS—SHEET 2.

WITNESS:
Robt R Kitchel

INVENTOR
Dean C. Lewis
BY Frank S. Busser
ATTORNEY

D. C. LEWIS.
MECHANICALLY OPERATED GEAR CHANGING MECHANISM FOR AUTOMOBILES.
APPLICATION FILED APR. 9, 1915.

1,169,081.

Patented Jan. 18, 1916.
4 SHEETS—SHEET 3.

WITNESS:
Rob't R Kitchel

INVENTOR
Dean C. Lewis
BY Frank S. Busser
ATTORNEY.

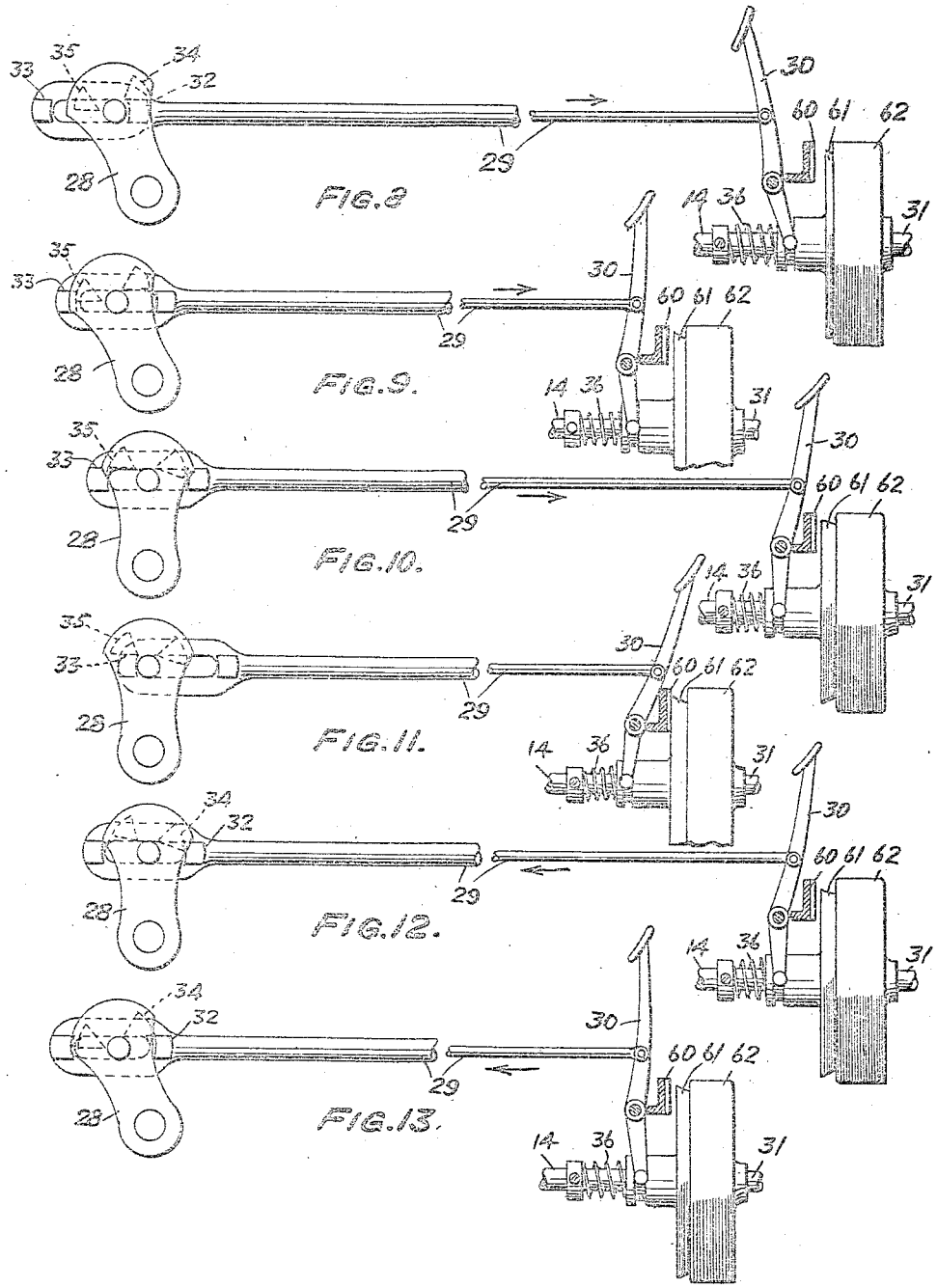

UNITED STATES PATENT OFFICE.

DEAN C. LEWIS, OF PHILADELPHIA, PENNSYLVANIA, ASSIGNOR TO LEWIS MANUFACTURING COMPANY, OF PHILADELPHIA, PENNSYLVANIA, A CORPORATION OF PENNSYLVANIA.

MECHANICALLY-OPERATED GEAR-CHANGING MECHANISM FOR AUTOMOBILES.

1,169,081.

Specification of Letters Patent.   Patented Jan. 18, 1916.

Application filed April 9, 1915.   Serial No. 20,136.

*To all whom it may concern:*

Be it known that I, DEAN C. LEWIS, a citizen of the United States, residing at Philadelphia, county of Philadelphia and State of Pennsylvania, have invented a new and useful Improvement in Mechanically-Operated Gear-Changing Mechanism for Automobiles, of which the following is a full, clear, and exact description, reference being had to the accompanying drawings, which form a part of this specification.

The object of my invention is to provide for changing gears of an automobile in such manner that the operator, by the mere swing of a lever, or by the operation of some equally simple device to some predetermined position, may so adjust mechanism that upon operating the ordinary clutch shifting contrivance, the said mechanism will coöperate with other mechanism to effect the shift of the gears to a position corresponding to the position of said lever. Mechanism adapted for this purpose is set forth in an application filed by me December 5, 1913, Serial No. 804,831. This mechanism is operative and efficient.

The object of the present invention is to improve this mechanism so as to adapt it to a wider range and render its operation more nearly perfect.

Another object of the present invention is to make provision for throwing out the clutch, neutralizing the gears, and applying a brake, in successive positions of the clutch lever in its clutch-releasing movement, and conversely, in the opposite spring-actuated movement of the clutch lever, to arrange for successively releasing the brake, shifting the gears and throwing in the clutch.

Figure 2:
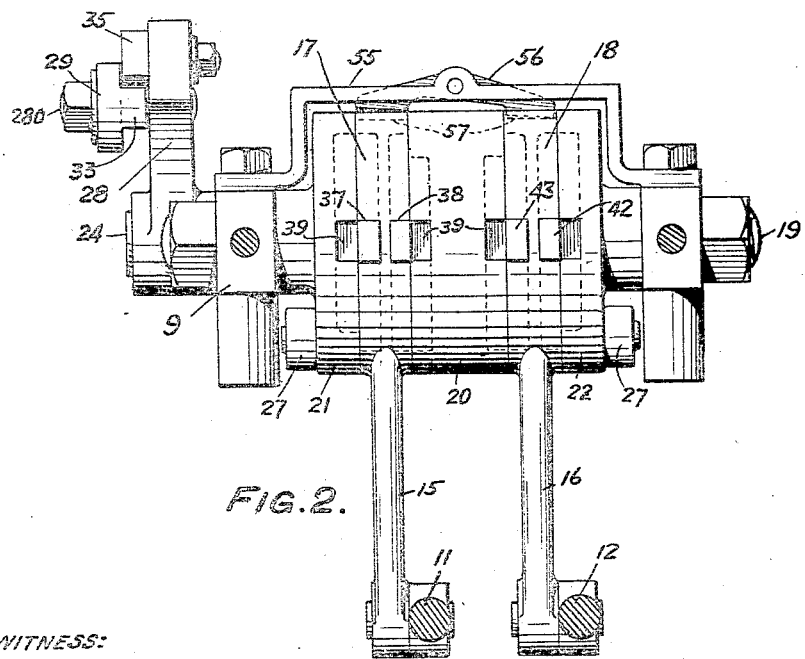
Figure 3:
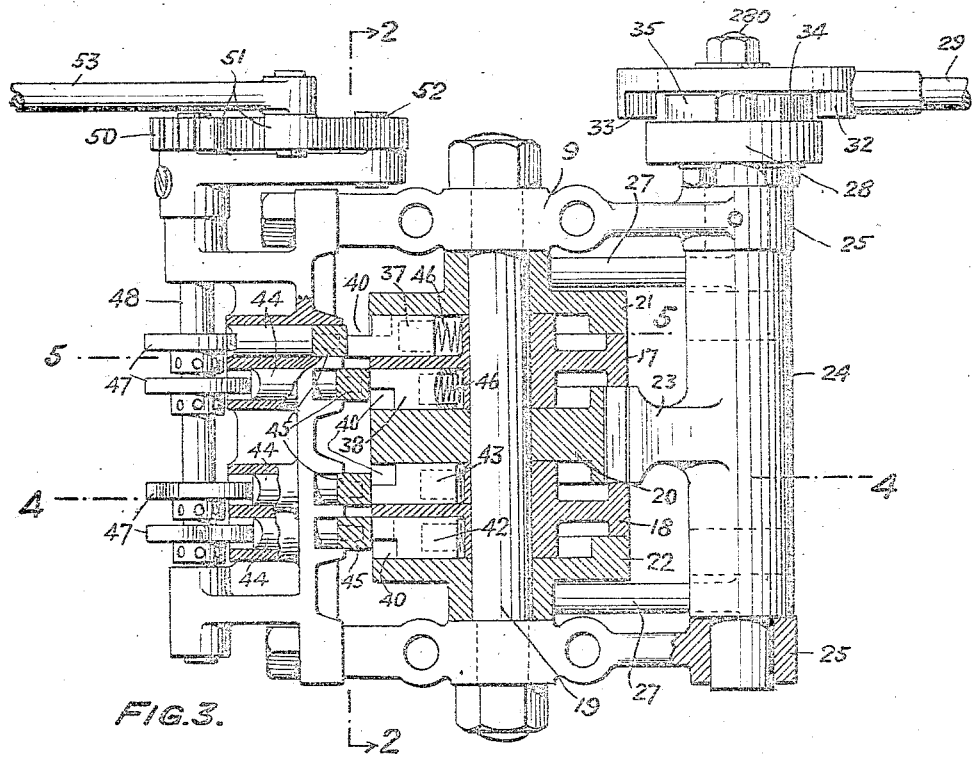
Figure 4:
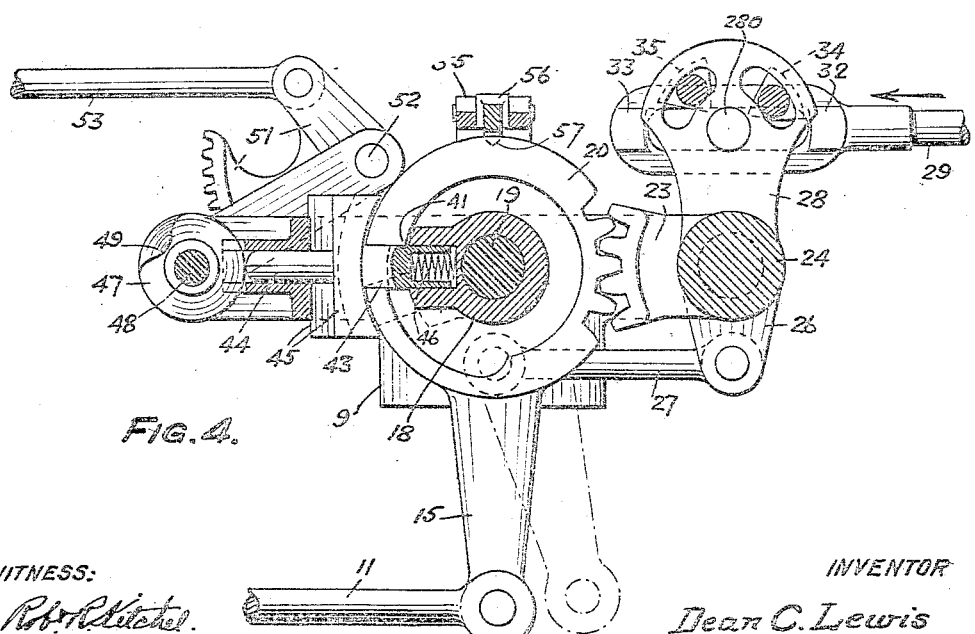
Figure 5:
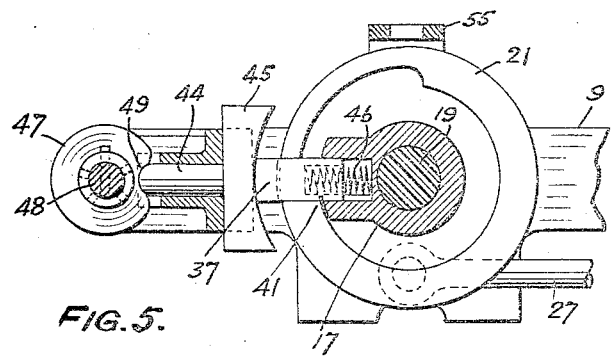
Figure 6:
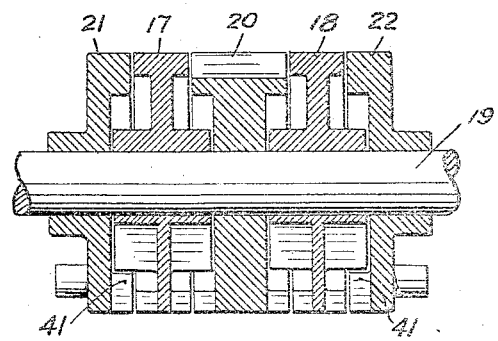
Figure 7:
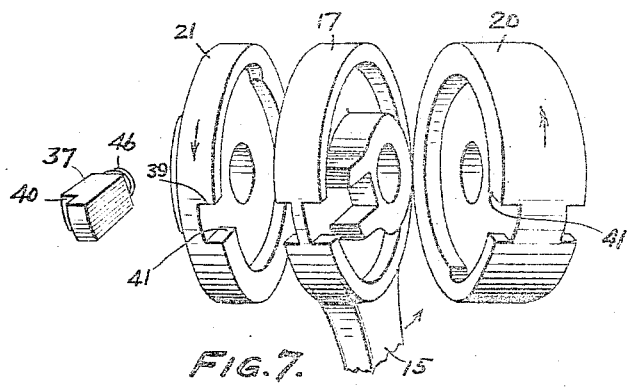

A preferred embodiment of the invention is shown in the drawings, in which:

Figure 1 is a more or less diagrammatic view showing an embodiment of my invention applied to an automobile. Fig. 2 is a section on the line 2—2 of Fig. 3. Fig. 3 is a plan view of the gear-changing mechanism partially in section. Fig. 4 is a section on the line 4—4 of Fig. 3. Fig. 5 is a section on the line 5—5 of Fig. 3. Fig. 6 is a horizontal section through the central portion of the gear-changing mechanism, similar to that shown in Fig. 3, with the parts slightly separated for clearness; and Fig. 7 is a perspective view of several contiguous parts shown spaced apart. Figs. 8 to 13 inclusive are diagrams showing the operation of successively operating the clutch, the gear shifting mechanism and the brake.

The gear case 10 contains any usual arrangement of change gears, adapted to be shifted by means of rods 11 and 12 so as to give the driven shaft 13 the usual varying speeds from the driving shaft 14, viz. reverse, zero, and first, second and third speeds forward. Rods 11 and 12 are connected to arms 15 and 16 depending from hubs 17 and 18 turnable on spindle 19. It may be assumed, for example, that when arms 15 and 16 are brought to a medium position, as shown in full lines in the drawings, the gears are in a neutral position and no motion is transmitted to shaft 13. When hub 17 is turned to draw rod 11 in one direction, say away from the gear case, as shown in broken lines in Fig. 4, the gears are shifted so as to give shaft 13 motion in the reverse position. When hub 17 is turned to move rod 11 toward the gear case, the gears are shifted to give shaft 13 motion in the same direction as the driving shaft, at low or first speed. Similarly when hub 18 is turned from medium position to move rod 12 away from or toward the gear case, the gears in the latter are shifted to give shaft 13 second or third speeds ahead respectively.

The above described gear-change is typical of those in common use and hence no detailed description of the gears in the gearcase is necessary here, as it forms no part of my invention. It will be understood however, that the number of changes may be more or less than that above described, and the number of hubs, like 17 and 18, made to suit the number of shifts required.

The mechanism by which the hubs are turned will now be described. 20 is a central disk mounted to turn on spindle 19 between hubs 17 and 18. 21, 22 are end disks similarly mounted on the outside of hubs 17 and 18. By this arrangement hub 17 of arm 15 is turnable between disks 20 on the one side and 21 on the other, and hub 18 of arm 16 is turnable between disks 20 and 22. Disk 20 has teeth cut in a portion of its periphery, which mesh with similar teeth in an arm 23 projecting from a rocker 24 turning in bearings 25 on the frame 9. Arms 26 depending from rocker 24 are connected by links 27 with disks 21 and 22. By this means, as may be readily seen in Fig. 4, turning rocker 24 gives a similar turn to disks 21, 22, but turns disk 20 in the opposite direction. The projecting end of rocker 24 carries an arm 28 actuated by rod 29 from the clutch lever 30, which is manually operable to release the clutch connecting driving shaft 14 from engine shaft 31. The first part of the forward movement of lever 30 serves to release the clutch, and to avoid operating the gear shift until after this release, rod 29 has a slotted connection with a pin 280 on arm 28, to allow a certain amount of free movement. 32, 33 are lugs on the rod at opposite ends of the slot, and 34, 35 are adjustable projections on arms 28.

In the position shown in Figs. 3 and 4, the gears are in neutral position and rod 29, under the impulse of clutch spring 36, has completed part of its clutch applying movement, in the direction of the arrow. At this point lug 32 engages projection 34. Further movement of rod 29 turns arm 28 and therewith rocker 24, which, as will hereafter be explained, shifts certain gears in the gear case. As arm 28 is thus turned, projection 34 gradually rises out of the path of the lugs, and as soon as this occurs the gear-shift movement ceases, and rod 29 is free to complete the movement given it by the spring-actuated clutch lever 30, which in this last movement allows the clutch to become operative.

When the clutch lever 30 is depressed, the clutch is released in its initial movement and rod 29 slides freely on pin 280 of arm 28 until lug 33 contacts with projection 35 (the projection having descended into the path of lug 33 by reason of the turning of lever 28 in the clutch-applying movement). Further movement of rod 29 carries arm 28 with it, turning rocker 24 in the opposite direction to that before described, and thereby bringing any gears that may be in mesh out of mesh or into neutral position, as will be hereinafter described. As arm 28 turns, projection 35 gradually rises out of the path of lug 33, and when this takes place, the gears have been shifted to neutral and rod 29 is free to finish its forward movement.

It is thus seen that pressure on the clutch lever first releases the clutch and then throws gears to neutral, and when the clutch lever is allowed to return, the shift of gears is made first and then the clutch thrown in. It will also be noted that in the clutch-releasing operation, after the clutch is released and the gears moved to neutral position, the rod 29 has a still further movement, which may be utilized to actuate a brake. Thus provision is made to successively release the clutch, shift the gears to neutral and apply the brake. In the reverse operation, the brake is first released, then the gears are shifted into a positive position, and then the clutch is applied.

In order that this operation may be more clearly understood, I have illustrated, in Figs. 8-13, successive positions of the rod 29 and of the gear-shifting rocker arm 28, the clutch and the brake. Thus, in Fig. 8, the gears may be assumed to have been shifted into a positive position, the clutch of course being on and the brake off. A simple known type of brake is shown, the same comprising a fixed brake-shoe 60 which is adapted to be engaged by the movable member 61 of the clutch when the same is fully retracted. The spring 36 has moved the slidable driven member 61 of the clutch into driving engagement with the driving clutch member 62 on the engine shaft 31 and the clutch rod 29 has been moved to the left so that the lug 33 has moved some distance to the left of projection 35 on the rocket arm 28. In the first part of the movement of the clutch lever 30 and clutch rod 29 to the right (Fig. 9), the clutch is released and the lug 33 moves into contact with the projection 35. Further movement of the clutch lever and clutch rod to the right (Fig. 10) causes lug 33, by its pushing engagement with projection 35, to swing the rocker arm 25 to effect the shift of the gears to neutral. In the last part of the movement of the clutch lever and clutch rod to the right (Fig. 11) the lug 33 slides under the projection 35 and therefore does not further swing the rocker arm 28 and the clutch member 61 has moved far enough to the left to cause it to operatively engage the brake-shoe 60. When pressure upon the clutch lever is released, the first movement of the clutch member 61 to the right (Fig. 12) releases the brake and causes lug 32, in the movement of clutch rod 29 to the left, to contact with projection 34. Further movement of the clutch lever and clutch rod to the left (Fig. 13) causes lug 32, by its pushing engagement with projection 34, to swing the rocker arm to effect the shift of the gears into the selected positive position. The final movement of the clutch lever and clutch rod to the left returns the parts to the position shown in Fig. 8, in which the clutch is again applied.

Gear shifting arms 15 and 16 are operated from the disks 20, 21, 22 as follows: Hub 17 of arm 15, carries radially slidable dogs 37, 38. Disk 21 is cored out interiorly to admit dog 37, and the resulting peripheral flange, which turns in contact with a similar flange on hub 17, has an opening 39, which together with a similar opening in flange of hub 17 admits the passage of dog 37 therethrough. At one side of opening 39, the flange of disk 21 is relatively thin. At the other side of opening 39, the flange is relatively thick and may be said to be provided with a projection 41. Normally the dog 37 is pushed in, as will be hereinafter explained in detail. Assuming that the dog is in its inner radial position, and that disk 21 is turned from its neutral position in the direction of the arrow, Fig. 7, the cut-away portion 40 of dog 37 will enable the relatively thin portion of the flange of disk 21 to clear the dog 37 without imparting its turning movement thereto and therefore without turning hub 17. Assuming, however, that the dog occupies its outer radial position, the turning of disk 21 from its neutral position in the direction of the arrow, Fig. 7, will carry dog 37 with it, which dog, being always in engagement with the opening in hub 17, will impart a similar turning movement to hub 17, the disk and hub being locked together by the dog as by a key. The return of disk 21 will necessarily return hub 17 to its neutral position.

The opposite face of hub 17, engaging dog 38, contacts with the central disk 20, which has a flanged face similar to flange on disk 21, with the difference that on the central disk the narrow flange is below the opening 39 therethrough, and the projection 41 is above said opening, as shown in Fig. 7. As disks 20 and 21 are moved in opposite directions by rocker 24, if both dogs 37 and 38 are in inward radial positions, moving arm 28 in the direction of the arrow, Fig. 5, turns both disks 21 and 20 without moving arm 15, as the narrow flange of disk 21 turns downward past the cut-away part 40 of dog 37 and the narrow flange of disk 20 turns upward past the cut-away part of dog 38. If, however, one of these dogs is moved to an outward radial position it will key hub 17 to the disk corresponding to such dog and the above movement of arm 38 will turn gear-shifting arm 15 to the right, Figs. 4 and 7, if dog 37 is out, or to the left if dog 38 is out, thereby shifting the gears to reverse or to first speed respectively. In a similar manner arm 16 is turned in one direction or the other by dogs 42 and 43, which have the same inward inoperative positions and outward operative positions as have dogs 37 and 38 and coact with flanges on the contiguous sides of disks 20 and 22. According to this arrangement it is necessary that no more than one of the dogs 37, 38, 42, 43 shall be in outward operative position at any one time.

The mechanism for dictating which dog, if any, shall be operative and for holding the other dogs inoperative will now be described. 44 are four plungers, one for each dog, slidably mounted in the frame 9 in alinement with the respective dogs. 45 are heads in said plungers contacting with the outer un-cut-away portions of the dogs. 46 are springs whereby the dogs and plungers are normally pressed outwardly away from spindle 19. Cams 47, mounted on a cam shaft 48 carried by frame 9, are in alinement with the respective plungers. Each cam bears against one of the plungers, and has a low point as shown at 49 Fig. 4, which, when it is presented to its plunger, allows the latter to be pressed outwardly by its spring 46 into operative position with respect to the flange on its operating disk as previously described. The cams 47 are pinned to the cam shaft. For each cam there is one pin hole in the shaft, and there are five pin holes in the hub of each cam. By this means the cams can be pinned to their shaft with the low points 49 staggered with respect to each other, and there will be one position in the turning of the shaft where no low point will be presented to a plunger and where they will all be held in inoperative position. Plunger heads 45 are of sufficient length to allow arms 15 and 16 to be turned in either direction to shift the gears and yet the dogs carried thereby will not override said heads (see dotted position in Fig. 4). By means of the five holes in the hub of each cam, the one neutral and the four operative points may be readily arranged in any order desired, care being taken that no two low points be operative at the same time.

Cam shaft 48 carries a pinion 50 operated by a quadrant on the lever 51 rigidly mounted at 52. Lever 51 is connected by rods and levers 53 with a selector 54. By turning the selector to any of the five detents shown, quadrant lever 51 is turned to bring the desired cam with its low point presented to its plunger, thereby rendering it operative to produce the desired gear shift as hereinbefore described.

While one of the arms 15 or 16 is holding a certain set of gears in mesh in the gear case, it is advisable to hold the other of said arms securely in their neutral position. To this end, see Figs. 2 and 4, there is a bridge piece 55 over the disks and hubs 17 and 18, and a see-saw lever 56 is pivoted centrally therein, whose ends depend over notches 57 formed at the tops of said hubs. The ends of lever 56 are of such length that the turning of one arm, say 15, forces the opposite end of said lever down into the notch in the top of the other arm 16, thereby preventing it from being accidentally turned. For example, suppose the car to be running on high speed, as would be indicated by the position of arm 16 in Fig. 1, and it is desired to change to first or low speed. Selector 54 is first moved to notch 1, as shown in Fig. 1, thereby turning cam shaft 48 so that the cam in alinement with dog 38 presents its low point to its plunger 44. This allows dog 38 to be projected outwardly as soon as the opening 39 in the flange of disk 20 turns into line with the dog, and at the same time holds the other three dogs in inoperative position. The clutch pedal 30 is now pressed. Its first movement releases the clutch. During this movement the gear shift device remains at rest, slotted rod 29 sliding freely on the pin on arm 28. Projection 35 is so set in arm 28 that when the clutch is released, lug 33 contacts with projection 35 and arm 28 is moved forward until the projection rides up out of the path of lug 33. This forward motion of arm 28 gives a turn to central disk 20, in the opposite direction, which, by virtue of projection 41 therein acting on dog 43, turns hub 18 to neutral, bringing arm 16 from the position shown in Fig. 1 to a vertical position. In this position openings 39 aline with the dogs, and dog 38 is pressed outwardly therethrough, thereby locking hub 17 with disk 20. Also, in this position, both notches 57 are in line of see-saw lever 56, and either one of hubs 17 or 18 may be turned, thereby locking the other hub neutral. Removing the pressure from lever 30 now allows spring 36 to return same, and as already described, prior to applying the clutch to the driving shaft, lug 32 contacts with projection 34 and arm 28 is rocked, turning disk 20 and with it arm 15 to shift the gears in the gear case to give the desired first speed. If selector 54 be turned to notch marked "N" (indicating neutral), the cams are so pinned to the cam shaft that no low point 49 is brought in line with its corresponding plunger 44. Thus, when, in the forward movement of the clutch lever, arms 15 and 16 are brought to the vertical, and openings 39 register with the dogs, none of said dogs is allowed to be pressed out into operative position. Therefore, when the clutch lever is returned and arm 28 moved in the opposite direction, the disks 20, 21, 22 will all turn freely without moving arms 15 or 16 and the gears in the gear case remain out of mesh. It is thus seen that prior to every change of gears, everything is brought into a neutral position, and that then only one gear shift, and that the one which has been previously dictated by the selector, may be made.

Having now fully described my invention, what I claim and desire to protect by Letters Patent is:

1. In a gear-changing mechanism for automobiles, the combination with a gear-shifting hub and a hub-actuating disk, both turnable on a common axis, of a dog interposed between the hub and disk and movable into and out of position to lock the hub and disk together, means to turn the disk, and selecting means to control the position of the dog.

2. In a gear changing mechanism for automobiles, the combination with a gear shifting hub and two hub-actuating disks on opposite sides of the hub, all turnable on a common axis, of means to turn the disks simultaneously in opposite directions, and selectively controlled means to lock either or neither disk to the hub.

3. In a gear changing mechanism for automobiles, the combination with two gear-shifting hubs and an intermediate disk, all turnable on a common axis, of means to turn the disk, and selectively controlled means to lock either or neither hub to the disk.

4. In a gear changing mechanism for automobiles, the combination with a gear shifting hub and two hub-actuating disks, one on each side of the hub, and all turnable on a common axis, of two dogs, one between each disk and the hub, each dog being movable into and out of position to lock its corresponding disk to the hub, means to turn the disks simultaneously in opposite directions, and selecting means to control the positions of the dogs.

5. In a gear-changing mechanism for automobiles, the combination with two gear shifting hubs and an intermediate disk, all turnable on a common axis, of two dogs, one between each hub and the disk, each dog being movable into and out of position to lock its corresponding hub to the disk, means to turn the disk, and selecting means to control the positions of the dogs.

6. In a gear changing mechanism for automobiles, the combination with two gear-shifting hubs and three hub-actuating disks in alternate relation to the hubs, of means to simultaneously turn the end disks in one direction and the middle disk in the opposite direction, and selectively controlled means to lock either of the hubs to either of the two disks adjacent thereto.

7. In a gear changing mechanism for automobiles, the combination with two gear-shifting hubs and three hub-actuating disks in alternate relation to the hubs, of means to simultaneously turn the end disks in one direction and the middle disk in the opposition direction, dogs, one between each hub and each of the two disks adjacent thereto, each dog being movable into and out of position to key together the particular hub and disk between which it is located, and selecting means to control the positions of the dogs.

8. In a gear changing mechanism for automobiles, the combination with two gear shifting hubs and three hub-actuating disks arranged alternately with the hubs and all turnable on a common axis, of means to simultaneously turn the end disks in one direction and the middle disk in the opposite direction, dogs, one between each hub and each of the two disks adjacent thereto, each dog being movable into and out of position to key together the particular hub and disk between which it is located, and selecting means to render all, or all but any one, of the dogs inoperative.

9. In a gear-changing mechanism for automobiles, the combination with a gear-shifting hub and a hub-actuating disk, both turnable on a common axis, of a dog interposed between the hub and disk and movable into and out of position to lock the hub and disk together, means to turn the disk, a spring tending to move the dog into operative position, and selecting means including a cam adapted to be moved into and out of position to hold the dog inoperative against the action of its spring.

10. In a gear-changing mechanism for automobiles, the combination with a gear-shifting hub and a hub-actuating disk, both turnable on a common axis, of a dog interposed between the hub and disk and movable into and out of position to lock the hub and disk together, means to turn the disk, a plunger adapted, when advanced, to move the dog into inoperative position, a spring tending to move the dog into operative position and retract the plunger, and selecting means including a cam adapted to be moved into and out of position to advance the plunger.

11. In a gear changing mechanism for automobiles, the combination with a gear shifting hub and a hub actuating disk, both turnable on a common axis and having peripheral flanges cut away to form an opening, of a dog radially movable in said opening and adapted when moved out to lock the hub to the disk and provided with a cut-away portion adapted, when the dog is moved in, to underrun the flange on the disk and thereby permit the disk to turn without turning the hub, and selecting means adapted to control the radial position of the dog.

12. In a gear-changing mechanism for automobiles, the combination with a gear shifting hub and a hub actuating disk, both turnable on a common axis and having peripheral flanges cut away to form an opening, the flange on the disk being narrower at one side of said opening than at the other, of a dog radially movable in said opening and adapted when moved out to lock the hub to the disk and provided with a cut-away portion adapted, when the dog is moved in, to move within the narrow part of the disk flange and permit the disk to turn without turning the hub, and selecting means adapted to control the radial position of the dog.

13. In a gear changing mechanism for automobiles, the combination with a gear shifting hub and a hub actuating disk, both turnable on a common axis and having peripheral flanges cut away to form an opening, of a dog radially movable in said opening and adapted when moved out to lock the hub to the disk and having a cut-away portion adapted, when the dog is moved in, to underride the flange on the disk and thereby permit the disk to turn without turning the hub, a plunger adapted when advanced to move the dog into inoperative position, a spring tending to retract the plunger and move the dog into operative position, and selecting means including a cam adapted to be moved into and out of position to advance the plunger.

14. In a gear-changing mechanism for automobiles, the combination with gear-shifting hubs and hub-actuating disks arranged alternately and turnable on a common axis, of a series of dogs each adapted to key together a disk and an adjacent hub, means to turn the disks in unison, and selecting means to render different combinations of dogs inoperative.

15. In a gear-changing mechanism for automobiles, the combination with gear-shifting hubs and hub-actuating disks arranged alternately and turnable on a common axis, and means to turn the disks in unison, of a series of radially movable dogs each adapted to key together a disk and an adjacent hub when moved to one radial position and each so shaped that when moved to another radial position it will be inoperative as a key, and selecting means to control the radial positions of the dogs.

16. In a gear-changing mechanism for automobiles, the combination with gear-shifting hubs and hub-actuating disks arranged alternately and turnable on a common axis and means to turn the disks in unison, of radially movable dogs, said disks and hubs being cut away to form openings for the reception of the dogs to permit the latter to act as keys between adjacent hubs and disks, the disks and dogs being cut away to allow the disks to clear their corresponding dogs when the dogs are moved into one radial position, and selecting means to control the radial positions of the dogs.

17. In a gear changing mechanism for automobiles, the combination with two gear shifting hubs and an intermediate disk, all turnable on a common axis, of means to turn the disk, selectively controlled means to lock either hub to the disk whereby such hub is turned with the disk, and independent means to hold one hub from turning after the other has been so turned.

18. In a gear changing mechanism for automobiles, the combination with two gear shifting hubs and an intermediate disk, all turnable on a common axis, of means to turn the disk, selectively controlled means to lock either hub to the disk whereby such hub is turned with the disk, and a pivoted see-saw lever coöperating with notches in the hubs whereby the movement of one hub tilts the lever into engagement with the notch in the other hub to hold the latter from turning until the first hub is returned to its neutral position.

19. In a gear-changing mechanism for automobiles, the combination of clutch-shifting mechanism adapted to be operated in one direction to release the clutch, gear-changing mechanism, and connections between the clutch-shifting mechanism and the gear-changing mechanism, said connections including means providing a limited movement for the clutch-shifting mechanism relative to the gear-changing mechanism in the initial and final part of the clutch-releasing movement and rendering the gear-changing mechanism operative only in the intermediate part of the clutch-releasing movement.

20. In a gear changing mechanism for automobiles, the combination of clutch-shifting mechanism adapted to be operated in one direction to apply the clutch, gear changing mechanism, and connections between the clutch shifting mechanism and the gear-changing mechanism, said connections including means providing a limited movement for the clutch-shifting mechanism relative to the gear-changing mechanism in the initial and final part of the clutch-applying movement and rendering the gear-changing mechanism operative in the intermediate part of the clutch-applying movement.

21. In a gear-changing mechanism for automobiles, the combination of clutch-shifting mechanism adapted to be manually operated in opposite directions to apply and release the clutch, gear-changing mechanism, and connections between the clutch-shifting mechanism and the gear-changing mechanism, said connections including means providing a limited movement for the clutch-shifting mechanism relative to the gear changing mechanism in the initial and final part of the clutch-operating movement in each direction and rendering the gear-changing mechanism operative in the intermediate part of the clutch operating movement.

22. In a gear-changing mechanism for automobiles, the combination with a clutch and a brake, of a clutch-shifting rod, gear-changing mechanism including an actuating arm, and coöperating means on the rod and arm permitting the rod, when actuated in either direction, to actuate the arm to shift the gears and to move relatively to the arm before and after so actuating it, and connections from the rod to the brake and clutch for actuating one in the preliminary relative movement and the other in the final relative movement.

23. In a gear-changing mechanism for automobiles, the combination with a clutch and a brake, of a clutch-shifting rod, gear-changing mechanism including an actuating arm, and coöperating means on the rod and arm permitting the rod, when moved in one direction, to first move relatively to the arm to release the clutch, then actuate the arm to operate the gear-changing mechanism, and then move relatively to the arm to apply the brake.

24. In a gear-changing mechanism for automobiles, the combination with a clutch and a brake, of a clutch-shifting rod, gear-changing mechanism including an actuating arm, and coöperating means on the rod and arm permitting the rod, when moved in one direction, to first move relatively to the arm to release the brake, then actuate the arm to operate the gear-changing mechanism, and then move relatively to the arm to apply the clutch.

25. In a gear-changing mechanism for automobiles, the combination with a clutch-shifting rod, of gear-changing mechanism including an actuating arm, a pin and slot connection between the rod and the arm, a lug on the rod and a projection on the arm, said lug adapted, after a limited movement relative to the rod, to engage the projection and swing the arm and then underride the projection during the remaining movement of the rod.

26. In a gear-changing mechanism for automobiles, the combination with a clutch-shifting rod, of gear-changing mechanism including an actuating arm, a pin and slot connection between the rod and the arm, a pair of lugs on the rod and a pair of projections on the arm, said lugs adapted to coöperate with the projections to effect the swinging of the arm in an intermediate part of the movement of the clutch rod in either direction.

In testimony of which invention, I have hereunto set my hand, at Philadelphia, on this 7th day of April, 1915.

DEAN C. LEWIS.